United States Patent [19]
Bittler et al.

[11] Patent Number: 5,188,782
[45] Date of Patent: Feb. 23, 1993

[54] PRODUCTION OF PREFORMS FROM CERAMIC OR METALLIC FIBERS

[75] Inventors: Knut Bittler, Speyer; Johan H. H. Ter Maat, Mannheim; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 596,543

[22] Filed: Oct. 3, 1990

[30] Foreign Application Priority Data

Oct. 24, 1989 [DE] Fed. Rep. of Germany ....... 3935276
Feb. 3, 1990 [DE] Fed. Rep. of Germany ....... 4003219

[51] Int. Cl.$^5$ ............................................. C04B 38/04
[52] U.S. Cl. .................................. 264/82; 264/63; 264/211.11; 264/328.2; 264/344
[58] Field of Search ............. 264/63, 82, 344, 211.11, 264/328.2

[56] References Cited

U.S. PATENT DOCUMENTS

| | | | |
|---|---|---|---|
| 4,619,798 | 10/1986 | Tanaka | 264/63 |
| 4,624,812 | 11/1986 | Farrow | 264/63 |
| 5,043,121 | 8/1991 | Wingefeld | 264/63 |

OTHER PUBLICATIONS

Advanced Ceramics Report, vol. 4, No. 8, Aug. 1989, p. 6.
Chemical Abstracts, vol. 103, entry 186625 (1985).

Primary Examiner—James Derrington
Attorney, Agent, or Firm—Keil & Weinkauf

[57] ABSTRACT

Preforms are produced from ceramic and/or metallic fibers by injection molding or extruding a mixture containing the fibers and a thermoplastic binder, said thermoplastic binder being polyoxymethylene, which after the shaping is removed by treatment in a gaseous acid-containing atmosphere or in a gaseous $BF_3$-containing atmosphere.

6 Claims, No Drawings

PRODUCTION OF PREFORMS FROM CERAMIC OR METALLIC FIBERS

Ceramic fibers or metallic fibers based on aluminum oxide, silicon carbide or titanium are increasingly used for the mechanical reinforcement of metals. Aluminum alloys in particular can be made significantly more high temperature resistant through incorporation of up to 30% by volume of ceramic fiber.

To produce such fiber-reinforced metals, the ceramic or metallic fibers are made into a melt-permeable molding, or preform. This preform is placed into the mold with which the metal part is cast. The liquid metal is poured into the mold and surrounds the emplaced preform and then solidifies by cooling. The result is that reinforcing fibers are present in those areas where they are actually needed.

However, it is very expensive to make the preforms. Customarily, preforms are produced by interlacing continuous fibers. Since, however, ceramic fibers tend to break in flexure, it has become common first to coat the fibers with an organic binder. Thereafter the fibers are cut into short pieces and suspended with water or a solvent to form a pulp. This pulp is introduced into porous molds, from where the water or solvent is removed by filtration or evaporation. The loose fiber mass remaining behind is bound by heating to above the flow point of the binder, with or without compaction under pressure. After cooling, the binder is removed by dissolving or burning it out before the molten metal is poured over the preform.

This method of making the fiber-containing preforms has a number of disadvantages. First, it is time-consuming and accordingly the preforms are expensive. Secondly, it is barely possible to make preforms which have a complicated shape. In a recent process (Advanced Ceramics Report, Vol. 4, No. 8, August, 1989, page 6), short ceramic or metallic fibers are mixed with an organic thermoplastic binder in the presence of dispersants and the resulting green composite material with its fiber content of from 10 to 40% by volume is subjected to injection molding. Injection moding makes it possible to use large numbers of complicatedly shaped articles. After molding, the thermoplastic binder has to be removed by a complicated method, usually by pyrolysis, which takes hours or days, depending on the wall thickness.

It is an object of the present invention to provide a process for producing preforms from ceramic or metallic fibers by shaping a mixture which contains the fibers and a thermoplastic binder by injection molding or extrusion and removing the binder, which process should be free of the abovementioned defects and in particular ensure the production of geometrically complicated preforms at a high rate of production.

We have found that this object is achieved when the binder used is polyoxymethylene and it is removed after the shaping stage by treatment in a gaseous acid-containing atmosphere or in a gaseous $BF_3$-containing atmosphere.

In detail, the process according to the present invention comprises mixing the ceramic or metallic fibers with the polyoxymethylene and granulating the mixture at temperatures above the melting point of the polyoxymethylene. Suitable fibers are ceramic or metallic fibers formed for example from $Al_2O_3$, $ZrO_2$, $SiO_2$, $Y_2O_3$, $Si_3N_4$, SiC, Si, Fe, B or Ti. Fibers for the purposes of the present invention also include whiskers, for example iron whiskers. The fibers range in diameter from 0.1 to 50 μm. Instead of fibers made of one material it is of course also possible to use fibers made of different materials. The polyoxymethylene used can be not only a homopolymer but also a copolymer of formaldehyde ranging in molecular weight from 25,000 to 75,000. Copolymers for the purposes of the present invention are polymers of formaldehyde or trioxane with, for example, ethylene oxide, 1,3-dioxolane or butanediol formal, which may be present in amounts of for example 2-10 mass %.

The mixtures to be molded, in addition to the inorganic fibers, contain from 30 to 90% by volume, preferably from 30 to 60% by volume, of polyoxymethylene.

In addition, they may also contain wetting agents, plasticizers or other auxiliaries which have a favorable influence on the rheological properties of the mixtures at the molding stage.

The molding compositions are prepared in a conventional manner in a kneader or extruder at from 150° to 200° C. If desired, the composition may be granulated after cooling.

If injection molding is used, it is possible to use the customary screw and plunger type injection molding machines, with the injection molding taking place at 175°-200° C. at 3,000-20,000 kPa into a shape which is maintained at 20°-120° C.

According to the present invention the demolded fiber-containing materials are then treated in a gaseous acid-containing atmosphere for the purpose of removing the binder. The gaseous acid-containing atmospheres for the purposes of the present invention are not only pure acids which are in gas or vapor form at the treatment temperatures, but also mixtures of acids with a carrier gas. Suitable carrier gases are for example air, nitrogen and noble gases. Suitable acids are those inorganic acids which are gaseous at room temperature, for example hydrogen halides or hydrogen sulfide, and also those acids which are markedly vaporizable at the treatment temperatures, for example nitric acid. Suitable organic acids are basically those acids which have a boiling point of below 130° C. under atmospheric pressure, e.g. formic acid, acetic acid or trifluoroacetic acid.

However, the shaped articles obtained can also be treated in a gaseous $BF_3$-containing atmosphere to remove the binder. Gaseous $BF_3$-containing atmospheres for the purposes of the present invention include not only pure $BF_3$ (boron trifluoride) but also mixtures of boron trifluoride with a carrier gas. Suitable carrier gases are for example air, nitrogen and noble gases.

Instead of boron trifluoride it is of course also possible to use adducts of boron trifluoride which at the treatment temperatures are reversibly cleavable back into the starting components without decomposition of said components. Of particular suitability are the addition compounds of boron trifluoride with ethers, e.g. dimethyl ether, diethyl ether, dibutyl ether and di-tert-butyl methyl ether.

The green body is contacted with the acid- or $BF_3$-containing atmosphere at 20°-150° C., preferably 70°-150° C. The concentration of the acid or of the boron trifluoride in the gas and the temperature employed determine the duration of the treatment in that increasing temperature and increasing concentration of acid or boron trifluoride shorten the treatment. If a carrier gas is used, it is for example passed initially through the acid or $BF_3$, or $BF_3$-adduct, for it to become laden. The laden carrier gas is then brought to the treatment temperature, which should advantageously be not less than 10° C. above the lading temperature in order that any condensation may be avoided. After leaving the treatment space, the acid or $BF_3$ can be condensed out of the gas mixture, which contains not only formaldehyde and trioxane but also further decomposition products of the polyoxymethylene, for reuse.

The process according to the present invention gives unique advantages in the removal of the binder. One advantage is that removal of the binder takes place at low temperatures and that no homogeneous decomposition takes place; that is, the decomposition proceeds exclusively from the polymer/gas phase progressively in the inward direction and no undesirable evolution of gas takes place in the interior of the molding. This ensures a rapid, unhindered escape of the decomposition gases toward the outside. It is also possible to carry out the treatment far below the softening temperature (150° C.) of the polyoxymethylene. This makes it possible to avoid any plastic deformation of the green body during the removal of the binder and so ensure dimensional accuracy.

A further advantage of the process according to the present invention is the extremely low temperature (20°–130° C.) at which removal is possible. At such low temperatures it will in general be possible to dispense with the inert atmosphere which is customarily used with nonoxidic fibers and metal fibers to prevent surface oxidation.

The fiber preforms produced by the process according to the present invention are suitable for the manufacture of fiber-reinforced metals by embedding them in the molten metal and subsequently solidifying the molten metal.

EXAMPLES

Example 1

75 g of a commercial copolymer of polyoxymethylene and 2% by weight of butanediol formal, 200 g of short aluminum oxide fibers 0.5 mm in average length and 12 μm in diameter and 5 g of polyethylene glycol as lubricant were used to prepare in a heatable laboratory kneader a granular product which was formed with a normal injection molding machine into small rods 6×4×50 mm in size with a polyoxymethylene content of 51.4% by volume.

One rod was treated at a vessel temperature of 110° C. with a gas mixture obtained by passing nitrogen through hot formic acid at 90° C. at a rate of 20 l/h, for 7.5 hours. The weight loss was 26.1%, which corresponds essentially to the polyoxymethylene content. There was no change in the dimensions of the rod used.

Example 2

A rod of Example 1 was heated at 300° C. for one hour. This resulted in a weight loss of 27.0%.

The preform obtained had become distorted, the degree of distortion, measured as a nonisotropic change in length, being up to 5.6%.

Example 3

200 g of a commercial copolymer of polyoxymethylene and 2.5% by weight of butanediol formal, 76 g of short aluminum oxide fibers 0.5 mm in average length and 12 μm in diameter and 2.0 g of polyethylene glycol of molecular weight 400 as lubricant were used to prepare with a heated laboratory kneader at 180° C. a granular product which was formed with an injection molding machine into rods measuring 6×4×50 mm.

The fiber content was 12% by volume.

One rod was treated at 130° C. with a gas mixture of 98% by volume of nitrogen and 2% by volume of boron trifluoride for 1 hour. The weight loss was 72.0%, which corresponds essentially to the polyoxymethylene content. There was no change in the dimensions.

We claim:

1. A process for producing a preform from ceramic or metallic fibers by shaping a mixture containing the fibers and a thermoplastic binder by injection molding or extrusion and removing the binder, wherein the binder used is polyoxymethylene and it is removed after the shaping by treatment in a gaseous acid-containing atmosphere or in a gaseous $BF_3$-containing atmosphere.

2. A process as claimed in claim 1, wherein the mixture contains from 30 to 60% by volume of polyoxymethylene.

3. A process as claimed in claim 1, wherein fibers formed from $Al_2O_3$, $ZrO_2$, $SiO_2$, $Y_2O_3$, $Si_3N_4$, SiC, Si, Fe, B or Ti are used.

4. A process as claimed in claim 1, wherein the treatment is carried out at from 20° to 150° C.

5. A process as claimed in claim 1, wherein the acid used is nitric acid, a hydrohalic acid or an organic acid having a boiling point below 130° C.

6. A process as claimed in claim 4, wherein the treatment is carried out at from 70° C. to 150° C.

* * * * *